(12) United States Patent
Silva et al.

(10) Patent No.: US 10,936,045 B2
(45) Date of Patent: Mar. 2, 2021

(54) UPDATE MEMORY MANAGEMENT INFORMATION TO BOOT AN ELECTRONIC DEVICE FROM A REDUCED POWER MODE

(71) Applicant: HEWLETT-PACKARD DEVELOPMENT COMPANY, L.P., Houston, TX (US)

(72) Inventors: Thiago Silva, Porto Alegre (BR); Carlos Haas, Porto Alegre (BR); Taciano Perez, Porto Alegre (BR); Thierry Fevrier, Gold River, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 181 days.

(21) Appl. No.: 16/081,610

(22) PCT Filed: Sep. 26, 2016

(86) PCT No.: PCT/US2016/053797
§ 371 (c)(1),
(2) Date: Aug. 31, 2018

(87) PCT Pub. No.: WO2018/057039
PCT Pub. Date: Mar. 29, 2018

(65) Prior Publication Data
US 2019/0018475 A1 Jan. 17, 2019

(51) Int. Cl.
G06F 1/3234 (2019.01)
G06F 9/4401 (2018.01)
(Continued)

(52) U.S. Cl.
CPC .......... *G06F 1/3275* (2013.01); *G06F 9/4418* (2013.01); *G06F 11/1407* (2013.01);
(Continued)

(58) Field of Classification Search
CPC .. G06F 1/3275; G06F 9/4418; G06F 11/1407; G06F 11/1417; G06F 12/0246;
(Continued)

(56) References Cited

U.S. PATENT DOCUMENTS 6,564,286 B2 * 5/2003 DaCosta ............... G06F 9/4406
711/101
6,802,022 B1 10/2004 Olson
(Continued)

FOREIGN PATENT DOCUMENTS

WO 2008073618 A2 6/2008
WO 2010127365 A1 11/2010

*Primary Examiner* — Aurel Prifti
(74) *Attorney, Agent, or Firm* — Perry + Currier Inc.

(57) ABSTRACT

Examples disclosed herein relate to updating memory management information to boot an electronic device from a reduced power mode. In one implementation, prior to entering a reduced power mode, an electronic device creates a snapshot of instructions in a logically volatile partition of a partitioned persistent memory and manage the snapshot as a logically persistent partition. Prior to entering a resume mode, the electronic device updates memory management information to remap a portion of the partitioned memory resource including the snapshot to be managed as a logically volatile partition. The electronic device may resume execution from the snapshot.

15 Claims, 5 Drawing Sheets

(51) Int. Cl.
*G06F 11/14* (2006.01)
*G06F 12/02* (2006.01)

(52) U.S. Cl.
CPC ...... *G06F 11/1417* (2013.01); *G06F 12/0246* (2013.01); *G06F 2201/84* (2013.01); *G06F 2212/1028* (2013.01); *G06F 2212/7201* (2013.01); *Y02D 10/00* (2018.01)

(58) Field of Classification Search
CPC ......... G06F 2201/84; G06F 2212/1028; G06F 2212/7201
See application file for complete search history.

(56) References Cited

U.S. PATENT DOCUMENTS

| | | | |
|---|---|---|---|
| 6,842,823 B1 | 1/2005 | Olson | |
| 7,679,945 B2 | 3/2010 | Rizzo et al. | |
| 7,761,681 B2 | 7/2010 | Jewell et al. | |
| 8,612,676 B2 * | 12/2013 | Dahlen | G06F 3/0685 711/113 |
| 10,534,710 B2 * | 1/2020 | Doshi | G06F 12/084 |
| 10,642,743 B2 * | 5/2020 | Wang | G06F 12/0871 |
| 2002/0073358 A1 * | 6/2002 | Atkinson | G06F 9/4418 714/21 |
| 2006/0053325 A1 * | 3/2006 | Chary | G06F 11/323 713/320 |
| 2007/0294496 A1 * | 12/2007 | Goss | H04W 12/06 711/163 |
| 2008/0320459 A1 * | 12/2008 | Morris | G06F 9/526 717/162 |
| 2009/0164771 A1 * | 6/2009 | Reece | G06F 1/3203 713/2 |
| 2009/0198807 A1 | 8/2009 | Bailey et al. | |
| 2010/0030999 A1 * | 2/2010 | Hinz | G06F 3/0616 711/206 |
| 2010/0205421 A1 * | 8/2010 | Campbell | G06F 9/441 713/2 |
| 2010/0241815 A1 * | 9/2010 | McManis | G06F 3/0611 711/154 |
| 2010/0306773 A1 | 12/2010 | Lee et al. | |
| 2011/0022812 A1 | 1/2011 | Van Der Linden et al. | |
| 2012/0102347 A1 * | 4/2012 | Hobson | G06F 1/3287 713/323 |
| 2012/0102447 A1 * | 4/2012 | Tsai | G06F 30/327 716/134 |
| 2012/0166723 A1 * | 6/2012 | Araki | G06F 12/0871 711/113 |
| 2012/0166840 A1 * | 6/2012 | Rothman | G06F 9/4418 713/323 |
| 2013/0198456 A1 * | 8/2013 | Harrison | G06F 11/1441 711/118 |
| 2013/0290759 A1 * | 10/2013 | Kumar | G06F 1/3287 713/323 |
| 2014/0020083 A1 | 1/2014 | Fetik | |
| 2014/0112339 A1 | 4/2014 | Safranek et al. | |
| 2014/0189207 A1 * | 7/2014 | Sinclair | G06F 12/0246 711/103 |
| 2014/0195480 A1 * | 7/2014 | Talagala | G06F 12/0804 707/610 |
| 2014/0359205 A1 * | 12/2014 | Suzuki | G06F 12/0246 711/103 |
| 2015/0006835 A1 * | 1/2015 | Oberhofer | G06F 9/5077 711/162 |
| 2015/0046636 A1 * | 2/2015 | Seo | G06F 12/0246 711/103 |
| 2015/0081636 A1 * | 3/2015 | Schindler | G06F 11/1482 707/639 |
| 2015/0100738 A1 * | 4/2015 | Wang | G06F 11/3419 711/135 |
| 2015/0262696 A1 * | 9/2015 | Sakata | G06F 1/3275 365/185.18 |
| 2015/0347296 A1 * | 12/2015 | Kotte | G06F 3/0679 711/103 |
| 2016/0019158 A1 * | 1/2016 | Palacharla | G06F 12/084 711/129 |
| 2016/0034221 A1 * | 2/2016 | Zettsu | G06F 3/0659 711/103 |
| 2016/0041869 A1 * | 2/2016 | Davis | G06F 11/1012 714/773 |
| 2016/0117225 A1 * | 4/2016 | Yu | G06F 11/1666 714/15 |
| 2016/0350222 A1 * | 12/2016 | Podaima | G06F 12/0848 |
| 2017/0017402 A1 * | 1/2017 | Zheng | G06F 3/0605 |
| 2017/0046176 A1 * | 2/2017 | Perez | G06F 3/0679 |
| 2017/0242790 A1 * | 8/2017 | O'Krafka | G06F 3/0604 |
| 2017/0249002 A1 * | 8/2017 | Costa | G06F 13/42 |
| 2017/0270041 A1 * | 9/2017 | Talagala | G06F 12/08 |
| 2017/0344490 A1 * | 11/2017 | Blagodurov | G06F 12/1027 |
| 2018/0293164 A1 * | 10/2018 | Perez | G06F 12/0238 |
| 2019/0012484 A1 * | 1/2019 | Gulati | G06F 21/72 |

\* cited by examiner

| MANAGED AS VOLATILE 301 | MANAGED AS PERSISTENT 303 | 300 |
|---|---|---|
| USED 302 | AVAILABLE | |

MEMORY PARTITIONS AFTER FIRST BOOT OF ELECTRONIC DEVICE

FIG. 3A

| MANAGED AS VOLATILE 301 | MANAGED AS PERSISTENT 302 | 304 | 300 |
|---|---|---|---|
| USED | AVAILABLE | SNAPSHOT OF VOLATILE PARTITION 301 305 |  |

MEMORY PARTITIONS DURING HIBERNATE/SLEEP/STAND BY

FIG. 3B

| 301 | MANAGED AS PERSISTENT 302 | 304 | MANAGED AS VOLATILE 305 | 300 |
|---|---|---|---|---|
| AVAILABLE | USED | AVAILABLE |  |  |

MEMORY PARTITIONS AFTER RESUME

FIG. 3C

| MANAGED AS 501 VOLATILE | MANAGED AS PERSISTENT 503 | 500 |
|---|---|---|
| USED 502 | AVAILABLE | |

MEMORY PARTITIONS AFTER FIRST BOOT OF ELECTRONIC DEVICE

FIG. 5A

| MANAGED AS 501 PERSISTENT | MANAGED AS PERSISTENT 503 | 500 |
|---|---|---|
| SNAPSHOT | USED 502 | AVAILABLE |

MEMORY PARTITIONS DURING HIBERNATE/SLEEP/STAND BY

FIG. 5B

| MANAGED AS 501 VOLATILE | MANAGED AS PERSISTENT 503 | 500 |
|---|---|---|
| SNAPSHOT | USED 502 | AVAILABLE |

MEMORY PARTITIONS AFTER RESUME

FIG. 5C

UPDATE MEMORY MANAGEMENT INFORMATION TO BOOT AN ELECTRONIC DEVICE FROM A REDUCED POWER MODE

BACKGROUND

An electronic device may switch between different operating modes. For example, an electronic device may enter a reduced power mode, such as a hibernate, standby, or sleep mode. The device may be woken up from the reduced power mode by rebooting the device. A snapshot may be copied between different types of memory as an electronic device switches modes. For example, a snapshot may be created of instructions in volatile memory and transferred to persistent memory, such as non-volatile memory, prior to entering a reduced power mode. Prior to rebooting, the snapshot may be copied back from the persistent memory to volatile memory to resume execution from volatile memory.

BRIEF DESCRIPTION OF THE DRAWINGS

The drawings describe example embodiments. The following detailed description references the drawings, wherein:

FIGS. 3A, 3B, and 3C are diagrams illustrating examples of updating memory management of a partitioned persistent memory prior to entering and exiting a reduced power mode.

FIGS. 5A, 5B, and 5C are diagrams illustrating examples of updating memory management of a partitioned persistent memory prior to entering and exiting a reduced power mode.

DETAILED DESCRIPTION

An electronic device may enter a reduced power mode and return to an active operating mode by rebooting. In some cases, instructions are executed from a volatile memory during active operation to increase performance, but the instructions may be stored in a persistent type of memory during the reduced power mode such that they persist when the electronic device re-enters an active operating mode. In one implementation, a processor manages a partitioned persistent memory resource such that the electronic device executes instructions from a partition managed as logically volatile memory and saves data in a partition managed as logically persistent memory prior to a reduced power mode. The saved data may then be remapped to be managed as logically volatile memory upon reboot.

Updating memory management information as an electronic device switches between modes may allow an electronic device to switch between modes more quickly and efficiently. For example, updating the memory management information may prevent the transfer of instructions from a persistent memory to a volatile memory upon reboot. The memory management information may be updated to change a partition in a persistent memory resource from a logically volatile partition to a logically persistent partition and vice versa.

In one implementation, prior to an electronic device entering a reduced power mode, a memory management module creates a snapshot of instructions in a partition managed as a logically volatile memory partition. The memory management module may transfer the snapshot to a second partition managed as a logically persistent memory partition. The electronic device may then enter a reduced power mode, such as a sleep, standby, or hibernate mode. The electronic device may initiate a re-boot, and in response, the memory management module may remap the second partition to be managed as a logically volatile partition. The electronic device may boot from the snapshot in the second partition managed as a logically volatile partition.

In one implementation, an electronic device may update the mapping of the same partition between an active and reduced power mode and vice versa, for example, without copying a snapshot between partitions. The remapping may occur where a host device manages persistent memory partitions for another device. Prior to an electronic device entering a reduced power mode, the memory management module may create a snapshot in a partition managed as logically volatile memory and remap the partition to be managed as logically persistent memory. When a re-boot is initiated, the memory management module may remap the partition including the snapshot to be managed as a logically volatile partition and boot the device from the snapshot in the partition managed as a logically volatile partition.

Figure 1:
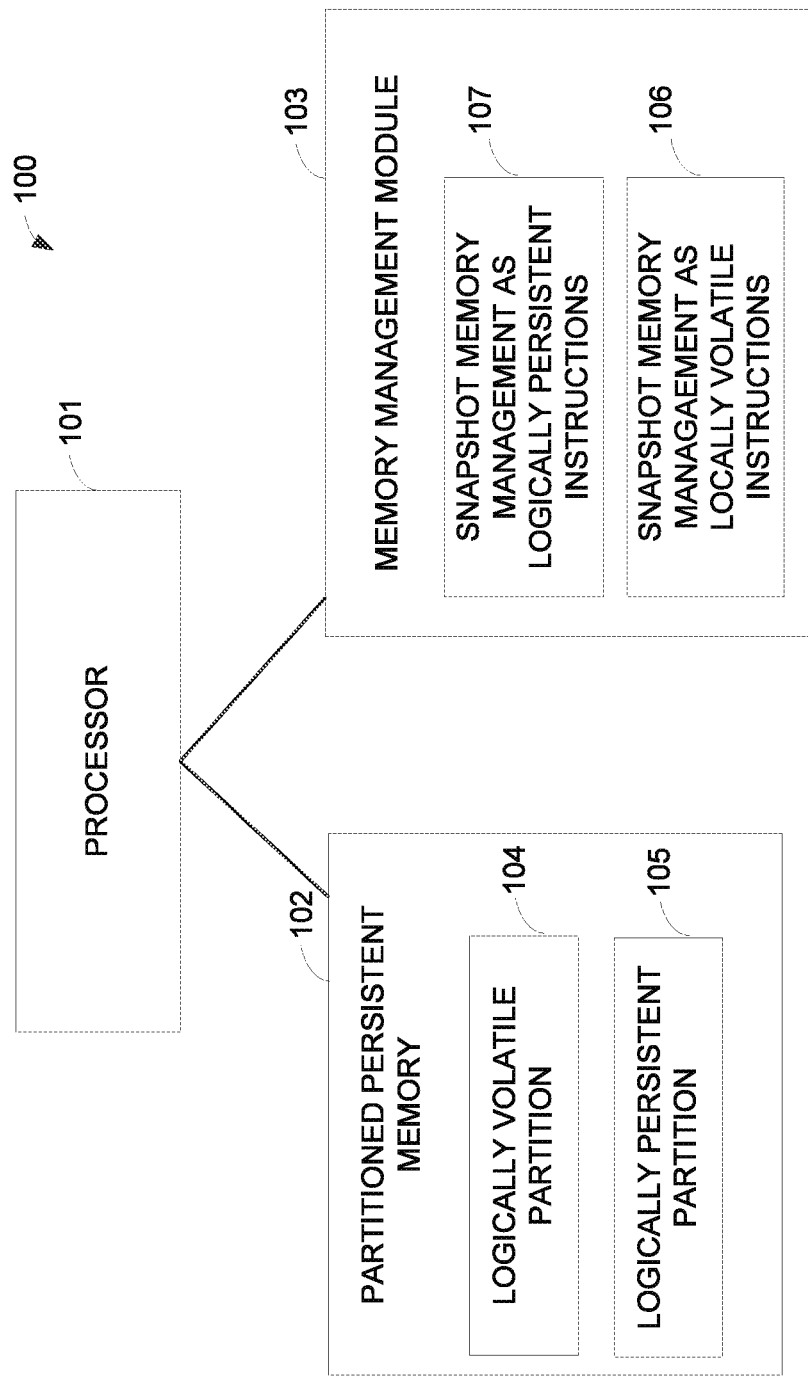
FIG. 1 is a block diagram illustrating one example of a computing system to update memory management information to boot an electronic device from a reduced power mode.

FIG. 1 is a block diagram illustrating one example of a computing system 100 to update memory management information to boot an electronic device from a reduced power mode. The computing system 100 may include a processor 101, a partitioned persistent memory 102, and a memory management module 103. The computing system 100 may be included in an electronic device, such as a laptop, or may be part of a distributed computing system, such as where the memory management module 103 is part of a host electronic device that manages a partitioned persistent memory 103 associated with a separate electronic device. In one implementation, the memory management module 103 includes instructions that are stored in the partitioned persistent memory 102.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The partitioned persistent memory 102 may be any suitable persistent memory. For example, the partitioned persistent memory 102 may be persistent after the electronic device is shut down. The partitioned persistent memory 102 may be directly accessible by the processor 101. The persistent memory may be, for example, a non-volatile memory, such as PCRAM, STT-RAM, or ReRAM, or a battery-backed DRAM.

The partitioned persistent memory 102 may be managed by the memory management module 103 such that different portions may be managed as different types of memory. For example, the partitioned persistent memory 102 may include a logically volatile partition 104 and a logically persistent partition 105. The logically volatile partition 104 include a range of addresses in the partitioned persistent memory 102 managed as logically volatile memory such that the contents do not persist across power cycles. The logically persistent partition 105 include a range of addresses in the partitioned persistent memory 102 managed as logically persistent memory such that the contents persist between power cycles.

The partitioned persistent memory 102 may include available and unavailable portions. For example, a first range of addresses in the logically persistent partition 105 may be used and a second range of addresses in the logically persistent partition 105 may be available to store additional information. The memory management module 103 may store information related to whether a range of address is available or unavailable.

The logically volatile partition 104 and the logically persistent partition 105 may be capable of being mapped as either logically volatile or logically persistent memory. For example, the memory management module 103 may remap the partitions and store information on the memory type associated with the partitions.

The memory management module 103 may manage the partitioned persistent memory 102. The processor 101 may communicate with the memory management module 103. The memory management module 103 may be a module in a machine-readable storage medium such as an electronic, magnetic, optical, or other physical storage device that stores executable instructions or other data (e.g., a hard disk drive, random access memory, flash memory, etc.). The machine-readable storage medium may be, for example, a computer readable non-transitory medium.

The memory management module 103 may include snapshot memory management as logically volatile instructions 106 and snapshot memory management as logically persistent instructions 107. The snapshot memory management as logically volatile instructions 106 may include instructions to remap a portion of the partitioned persistent memory 102 as a logically volatile partition, such as the logically volatile partition 104. The snapshot memory management as logically persistent instructions 107 may include instructions to remap a portion of the partitioned persistent memory 102 as a logically persistent partition, such as the logically persistent partition 105. The memory management module 103 may remap portions of the partitioned persistent memory 103 using operating system level instructions executed by the processor 101. For example, the memory management module 103 may include Advanced Configuration and Power Interface instructions to remap the partitioned persistent memory 103.

Figure 2:
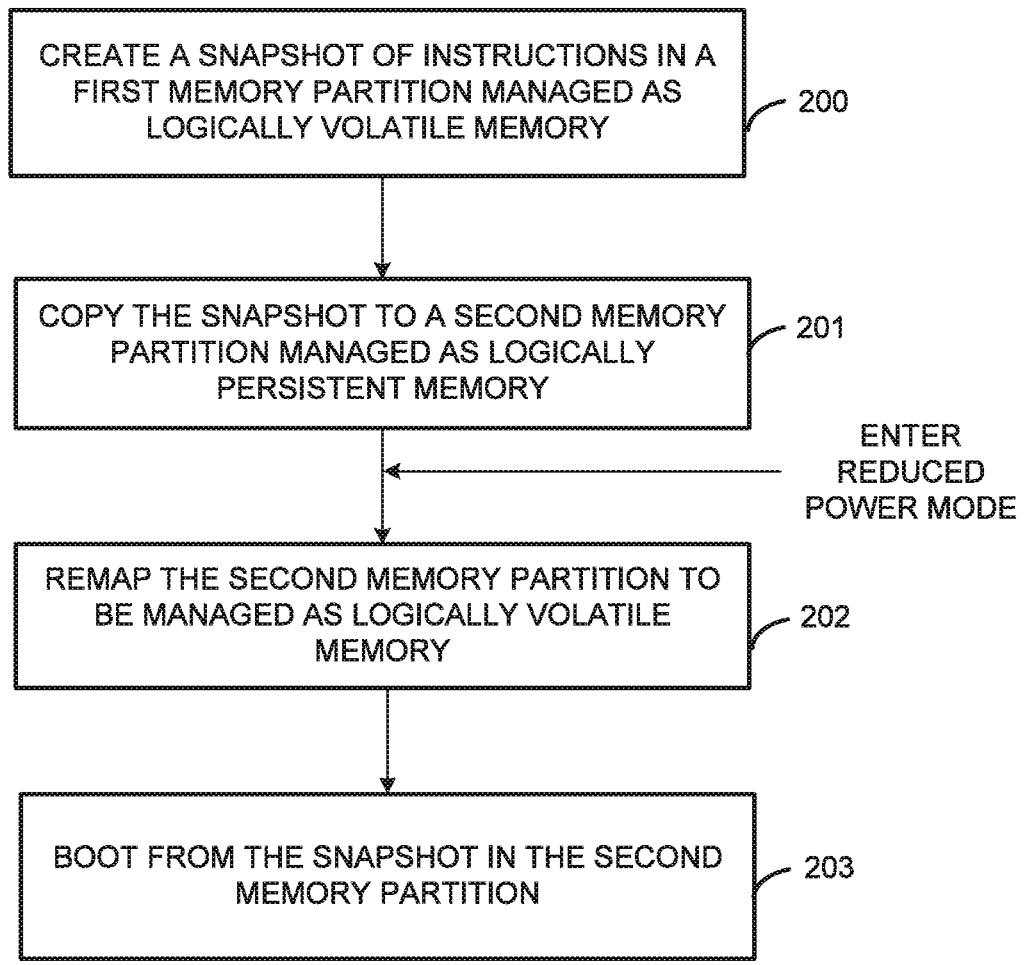
FIG. 2 is a flow chart illustrating one example of a method to update memory management information to boot an electronic device from a reduced power mode.

FIG. 2 is a flow chart illustrating one example of a method to update memory management information to boot an electronic device from a reduced power mode. For example, a processor may create a snapshot of a partition of memory managed as a logically volatile portion and copy the snapshot to a partition managed as logically persistent memory prior to enter a reduced power mode. Prior to leaving the reduced power mode, the processor may remap the partition including the snapshot to be managed as logically volatile memory and boot from the snapshot. The method may be implemented, for example, by the computing system 100 of FIG. 1.

Beginning at 200, a processor creates a snapshot of instructions in a first memory partition managed as logically volatile memory. For example, the processor may create a snapshot of a range of addresses in an area of memory managed as logically volatile memory. The electronic device may execute from the partition managed as logically volatile memory.

Continuing to 201, the processor copies the snapshot to a second memory partition managed as logically persistent memory. For example, the processor may copy the snapshot and store information related to the location and/or size of the transferred snapshot, such as a beginning address and length. The processor may create the snapshot in response to an instruction to enter a reduced power mode. The processor may update information about the portion of memory from which the snapshot was transferred. For example, the portion may be marked as available memory. In one implementation, the processor remaps the available portion such that it is no longer managed as logically volatile memory and becomes managed as available logically persistent memory.

The electronic device may then enter a reduced power mode, such as a sleep, hibernate, or standby mode after transferring the snapshot.

Continuing to 202, the processor remaps the second memory partition to be managed as logically volatile memory. For example, the processor may execute operating system instructions, such as Advanced Configuration and Power Interface instructions to remap the second partition.

Continuing to 203, the processor boots from the snapshot in the second memory partition managed as logically volatile memory. In one implementation, the processor compresses the snapshot prior to copying to the logically persistent memory and decompresses the snapshot in the second memory partition prior to booting.

FIGS. 3A, 38, and 3C are diagrams are diagrams illustrating examples of updating memory management of a partitioned persistent memory prior to entering and exiting a reduced power mode.

FIG. 3A shows a partitioned memory resource 300 after a first boot of an electronic device. The partitioned memory resource 300 includes partition 301 managed as a logically volatile partition and partitions 302 and 303 managed as logically persistent partitions. Partition 302 may be in use, and partition 303 may include available space.

FIG. 38 shows the partitioned memory resource 300 during a reduced power mode. For example, a memory management module may remap portions of the partitioned memory resource 300 prior to the electronic device entering a reduced power mode. For example, a snapshot may be created of the partition 301 and copied to the partition 303, which is divided into two partitions, an available partition 304 and a partition 305 including the snapshot. The partition 305 including the snapshot may be managed as logically persistent memory such that the snapshot stored in the partition 305 persists in the reduced power mode.

FIG. 3C shows the partitioned memory resource 300 after a resume operation to reboot the electronic device. The partitioned memory resource 300 includes partitions 301, 302, and 304 managed as logically persistent partitions. For example, the partition 301 may be managed as a logically persistent partition after the snapshot is copied to the partition 305. In one implementation, memory management information indicates that the partition 301 is an available partition of the logically persistent memory. Partition 305 is remapped to be managed a logically volatile partition such that the electronic device can boot from the snapshot in the partition 305 and continue execution from the partition 305.

Figure 4:
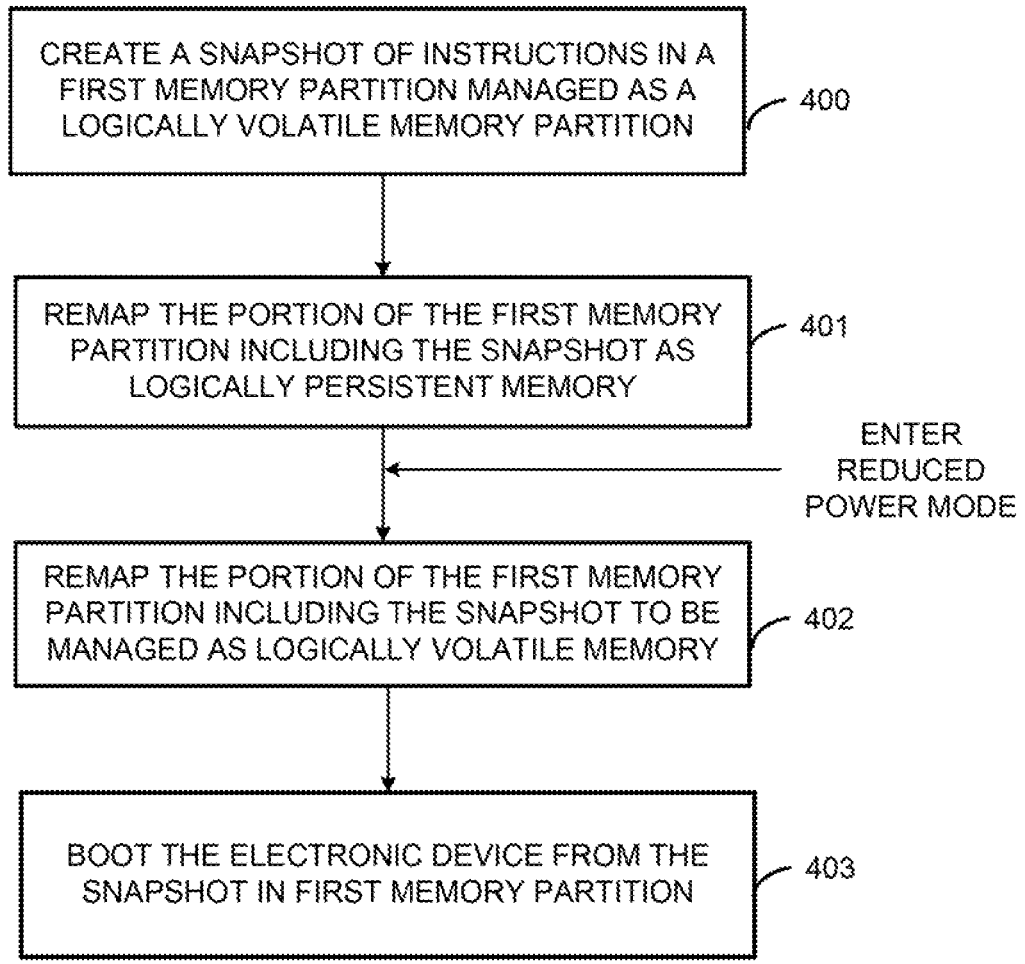
FIG. 4 is a flow chart illustrating one example of a method to update memory management information to boot an electronic device from a reduced power mode.

FIG. 4 is a flow chart illustrating one example of updating memory management information to boot an electronic device. For example, a memory management module may remap a partition of a persistent partitioned memory such that the same partition may switch between being managed as a logically volatile or logically persistent memory based on the current mode of the electronic device. For example, the partition may be mapped to function as a first type of memory during execution and may be remapped to function as a second type of memory prior to entering a reduced power mode. The method may be implemented, for example, by the computing system 100 of FIG. 1.

Beginning at 400, a processor creates a snapshot of instructions in a first memory partition managed as a logically volatile memory partition. For example, the first memory partition may be part of a partitioned persistent memory where partitions may be remapped to be managed as different types of memory. For example, information may be stored about the position of a partition, such as the start address and length, and information about the type of memory associated with the partition.

Continuing to 401, a processor remaps the portion of the first memory partition including the snapshot as logically persistent memory. For example, the first memory partition may be managed as if logically persistent memory such that the snapshot persists between power cycles and persists when the electronic device is in a reduced power mode.

After entering a reduced power mode and continuing to 402, a processor remaps the portion of the first memory partition including the snapshot to be managed as logically volatile memory. For example, the processor may execute operating system instructions, such as Advanced Configuration and Power Interface instructions to remap the first memory partition. The remapping may occur, for example, when the processor receives an instruction to reboot. The processor may remap the portion of the first memory partition including the snapshot, such as based on position information related to the snapshot. In one implementation, the snapshot is compressed prior to the electronic device entering a reduced power mode and decompressed prior to exiting the reduced power mode.

Continuing to 403, a processor boots the electronic device from the snapshot in first memory partition. For example, the snapshot may be in a portion of memory managed as logically volatile such that the electronic device may boot from and execute from the first memory partition.

FIGS. 5A, 56, and 5C are diagrams are diagrams illustrating examples of updating memory management of a partitioned persistent memory prior to entering and exiting a reduced power mode.

FIG. 5A shows a persistent partitioned memory resource 500 during execution after a first boot of an electronic device. The persistent partitioned memory resource 500 includes partitions managed as different types of memory such that the partitions may be remapped to update the type of memory management associated with the partition. The persistent partitioned memory 500 includes partition 501, partition 502, and partition 503. Partition 501 is managed as logically volatile memory. Partitions 502 and 503 are managed as logically persistent memory. Partition 502 is in use and partition 503 is available.

FIG. 5B shows the persistent partitioned memory resource 500 after the electronic device has entered a reduced power mode. For example, a snapshot of the partition 501 is created and managed as logically persistent memory.

FIG. 5C shows the persistent partitioned memory resource 500 after resuming execution of the electronic device after reboot. The partitions 502 and 503 may remain unchanged. Partition 501 is remapped to be managed as a logically volatile memory prior to reboot such that the electronic device can boot from the snapshot in the partition 501 as if rebooting from a volatile memory. Remapping memory partitions to simulate execution from a volatile memory and storage during reduced power in a non-volatile memory may provide better efficiency and lower storage cost for an electronic device.

The invention claimed is:
1. A computing system comprising:
a persistent partitioned memory resource including a first partition managed as being logically volatile and a second partition managed as being logically persistent;
a processing resource to execute a memory management module to:
prior to entering a reduced power mode,
create a snapshot of instructions in the first partition managed as logically volatile; and
manage the snapshot as being logically persistent by at least one of:
prior to copying the snapshot to the second partition managed as logically persistent determining an available portion of a first range of addresses that includes a used portion and the available portion; and
updating memory management information to change management of the first partition from being logically volatile to being logically persistent;
prior to entering a resume mode, update the memory management information to change a portion of the partitioned memory resource that includes the snapshot to be managed as being logically volatile; and
resume execution from the snapshot.

2. The computing system of claim 1, wherein the second partition managed as being logically persistent includes the used portion and available portions.

3. The computing system of claim 1, wherein updating the memory management information comprises executing operating system instructions.

4. The computing system of claim 1, wherein the reduced power mode comprises at least one of: a sleep, hibernate, and standby mode.

5. The computing system of claim 1, wherein creating the snapshot comprises creating the snapshot in response to an instruction to enter a reduced power mode.

6. The computing system of claim 1, wherein the memory management module is further to store location information and partition type information associated with the partitioned persistent memory.

7. A method, comprising:
prior to an electronic device entering a reduced power mode:
creating, at a persistent partitioned memory resource, a snapshot of instructions in a first memory partition of the persistent partitioned memory resource, the first memory partition managed as logically volatile; and
prior to copying the snapshot to a second memory partition persistent partitioned memory resource, the second memory partition managed as logically persistent, determining an available portion of a first range of addresses that includes a used portion and the available portion;
prior to booting the electronic device, changing management of the second memory partition from being managed as logically persistent to being managed as logically volatile; and
booting the electronic device from the snapshot in the second memory partition.

8. The method of claim 7, further comprising updating memory management information associated with the first memory partition managed as being logically volatile to being an the available partition.

9. The method of claim 7, further comprising, prior to entering the reduced power mode, storing information related to the size and location of the snapshot.

10. The method of claim 7, wherein changing management the second memory partition comprises configuring the second memory partition using Advanced Configuration and Power Interface instructions.

11. The method of claim 7, further comprising:

compressing the snapshot prior to copying; and decompressing the snapshot prior to booting.

12. A machine-readable non-transitory storage medium comprising instructions executable by a processor to:

prior to an electronic device entering a reduced power mode, determine that a first range of addresses includes a used portion and an available portion:

create, at a persistent partitioned memory resource, a snapshot of instructions in a first memory partition of the at a persistent partitioned memory resource, the first memory partition managed as being logically volatile; and change, at the persistent partitioned memory resource, the portion of the first memory partition that includes the snapshot, to being managed as logically persistent; and prior to booting the electronic device, change the portion of the first memory partition that includes the snapshot back to being managed as logically volatile; and boot the electronic device from the snapshot in first memory partition.

13. The machine-readable non-transitory storage medium of claim 12, further comprising instructions to determine a location and size of the snapshot and changing the portion of the first memory partition storing the snapshot to being managed as being logically persistent or logically volatile based on the determined size and location.

14. The machine-readable non-transitory storage medium of claim 12, wherein the non-active operating mode comprises at least one of: a sleep, stand by, and hibernate mode.

15. The machine-readable non-transitory storage medium of claim 12, further comprising instructions to:

compress the snapshot prior to enter the reduced power mode; and decompress the snapshot prior to rebooting the electronic device.

* * * * *